United States Patent [19]

Agarwal et al.

[11] 4,120,648
[45] Oct. 17, 1978

[54] DYE PREPARATION

[75] Inventors: Suresh C. Agarwal, Bottmingen; Zdenek Koci, Binningen, both of Switzerland

[73] Assignee: Ciba-Geigy Corporation, Ardsley, N.Y.

[21] Appl. No.: 751,224

[22] Filed: Dec. 16, 1976

[30] Foreign Application Priority Data

Dec. 23, 1975 [CH] Switzerland .................. 16690/75

[51] Int. Cl.² .................. C09B 67/00; D06P 1/642; C07D 233/34
[52] U.S. Cl. .................................. 8/85 R; 8/79; 260/96.5 R; 260/239.3 R
[58] Field of Search ............ 8/85 B, 85 R, 79; 260/96.5 R, 239.3 R

[56] References Cited

U.S. PATENT DOCUMENTS

| 2,290,945 | 7/1942 | Dahlen et al. ................. 8/85 |
| 2,486,562 | 11/1949 | Iamarino ........................ 8/79 |
| 2,716,113 | 8/1955 | Axe ............................. 260/96.5 R |
| 2,985,641 | 5/1961 | Herrmann ....................... 260/96.5 R |
| 3,086,833 | 4/1963 | Streck .......................... 8/79 |
| 3,096,142 | 7/1963 | Hartmark et al. ................ 8/85 |
| 3,287,345 | 11/1966 | Middlebrooks et al. ........ 260/96.5 R |
| 3,537,983 | 11/1970 | Fuller et al. .................. 260/96.5 R |
| 3,867,373 | 2/1975 | Wagner ......................... 260/239.3 R |
| 3,968,104 | 7/1976 | Wagner ......................... 260/239.3 R |

FOREIGN PATENT DOCUMENTS

| 701,711 | 12/1953 | United Kingdom ............ 260/239.3 R |
| 770,460 | 3/1957 | United Kingdom ............ 8/125 |
| 823,062 | 11/1959 | United Kingdom ............ 8/85 |
| 1,060,063 | 2/1967 | United Kingdom ............ 8/85 |
| 1,178,356 | 6/1970 | United Kingdom ............ 8/79 |

Primary Examiner—Joseph L. Schofer
Assistant Examiner—Maria S. Tungol
Attorney, Agent, or Firm—Edward McC. Roberts; Michael W. Glynn

[57] ABSTRACT

Solid dye preparation containing at least one water-soluble dye, a lactam of the formula

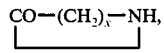

wherein $x$ represents the numbers 3 to 6, and optionally further additives.

1 Claim, No Drawings

DYE PREPARATION

The invention relates to a dye preparation containing a water-soluble dye and a lactam, to processes for producing this dye preparation, and to its use for the production of stable, nongelling padding liquors or dye baths.

It is known that a large number of water-soluble dyes give a solution which, on cooling to room temperature, has the tendency to gel. In consequence of this, the production of, in particular, concentrated padding liquors for modern continuous dyeing processes is rendered more difficult since the concentration of the dye in such padding liquors is very limited and in most cases is below 1%. For the prevention of this gel formation, it has already been suggested according to the U.S. Pat. No. 2,955,011 to add polyvinylpyrrolidone to solutions of direct dyes; and according to DOS No. 2,341,292, water-soluble dyes are diluted with polyvinyl alcohol.

It has now been found that surprisingly also the addition of certain lactams prevents this gel formation of water-soluble dyes. On the one hand these lactams are cheaper than polyvinylpyrrolidone and polyvinyl alcohol, and on the other hand they have, when used with water-soluble dyes, particularly with acid dyes, an antigelling effect which is better than that resulting from the use of polyvinyl alcohol.

The invention hence relates to a solid dye preparation containing at least one water-soluble dye and a lactam of the formula

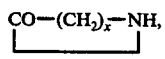

wherein $x$ represents the numbers 3 to 6.

In addition, these preparations can contain further additives, such as customary diluting agents, e.g. dextrin and urea, inorganic salts such as sodium chloride or sodium sulphate, anionic dispersing agents or anionic wetting agents such as nonyl phenol diglycol ether sulphate, or condensation products from cresol, naphtholsulphonic acid and formaldehyde, as well as antidusting agents.

Suitable water-soluble dyes are, in particular, anionic dyes, substantive dyes, acid dyes, 1:1 and 1:2 metal-complex dyes and mordant dyes as well as reactive dyes. Especially good results are obtained with acid dyes. Chemical classes of dyes which are applicable are, for example, anthraquinone, azo, azomethine or nitro classes.

The lactam used is preferably a lactam of the above formula wherein $x = 5$ (ε-caprolactam), which can be employed, e.g., in the pure form or in the form of a 1:1 adduct, e.g. thiourea:lactam or dicyanodiamide:lactam. The use of an adduct of this kind has the advantage that it can be more easily pulverised than, e.g., caprolactam, and that it is also less hygroscopic than caprolactam.

The dye preparation according to the invention preferably contains 0.1 to 3 parts, especially 0.2 to 1 part, relative to the amount of dye, of the lactam as defined.

The dye preparation can be in the form of a solid preparation, for example in the form of powder or granules. It is however also possible to add lactam and/or adducts to the dye bath or padding liquor.

The solid dye preparation is produced, e.g., by homogeneously mixing or grinding, in the dry state, at least one water-soluble dye and a lactam as defined, optionally together with further additives; or by mixing together the ground constituents in the dry state.

It is possible with the aid of the dye preparation according to the invention to produce padding liquors and dye baths such as are required for modern dyeing methods. Compared with analogous padding liquors or dye baths which do not contain the lactam as defined, the padding liquors or dye baths which contain this lactam have no tendency to gel on cooling. The analogous dye preparations therefore cannot be used for producing concentrated padding liquors or dye baths, whereas with the dye preparation according to the invention it is possible to produce padding liquors or dye baths having a dye concentration about 5 to 8 times higher than that otherwise possible.

The invention is illustrated by the following Examples without its scope being limited by them. Temperatures are given in degrees Centigrade.

EXAMPLE 1

If 30 g of the dye of the formula

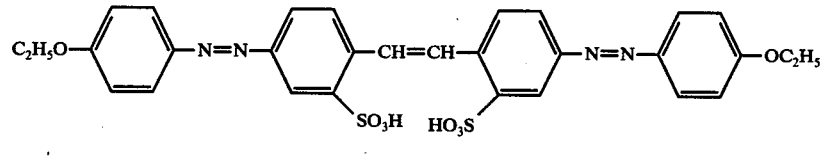

is dissolved in 1 liter of boiling water, the solution is unusable for pad dyeing after a short time even at temperatures above 60°, because the dye solution gels. If however an addition is made to the hot solution of 30 g of ε-caprolactam, a dyeing can be carried out with this dye liquor without difficulty since no gelling of the dye liquor occurs.

EXAMPLE 2

A padding liquor containing per liter of water 50 g of the dye of the formula

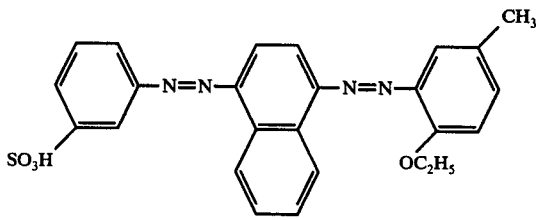

50 g of urea, 5 g of nonyl phenol diglycol ether sulphate and 2 g of ammonium sulphate rapidly gels at 40° to 50° and gives uneven dyeings. Gelling is completely prevented by the addition of 10 g of ε-caprolactam, and level dyeings are obtained.

EXAMPLES 3 AND 4

An equivalent prevention of gel formation is obtained by using in Example 2, instead of 10 g of caprolactam, 18 g of the 1:1 adduct of ε-caprolactam and thiourea, or 18 g of the 1:1 adduct of ε-caprolactam and dicyanodiamide.

EXAMPLE 5

20 g of the dye of the formula

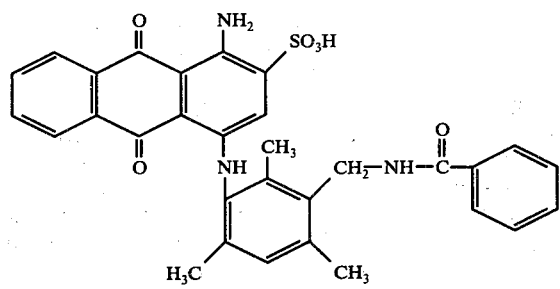

is completely dissolved with 10 g of sodium sulphate in 1 liter of boiling water. The solution gels already at 58°. If however the sodium sulphate is replaced by an equal amount of ε-caprolactam, no formation of gelling occurs even on cooling to 30°.

EXAMPLE 6

20 parts of the dye of the formula

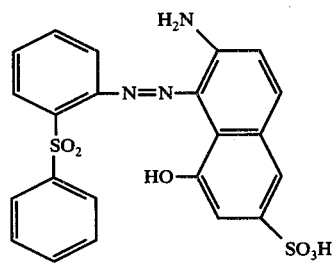

is mixed dry with 18 parts of a 1:1 adduct from caprolactam and thiourea. 38 g of this powder is dissolved in 1 liter of water at 100° and the solution is allowed to stand. The solution exhibits no tendency to gel down to 33°. If sodium sulphate is used instead of the adduct, the solution gels already at 62°.

EXAMPLE 7

5 g of the dye according to Example 2 is mixed respectively with 1 g of polyvinyl alcohol (Rhodoviol 4/125P) and with 1 g of ε-caprolactam, and the mixture in each case is dissolved in 100 ml of water at 100°. The solution with polyvinyl alcohol gels immediately at 40°. The solution containing ε-caprolactam remains thinly liquid for hours at this temperature.

EXAMPLE 8

30 g of the dye of the formula

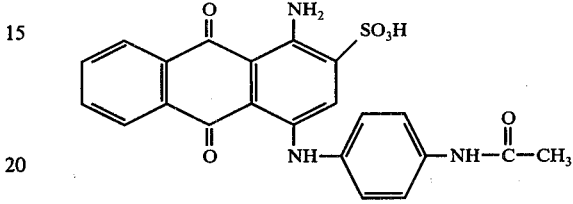

is dissolved in 1 liter of water at 100°. The solution shows already at 60° a tendency to gel. Gelling is suppressed however by dissolving with the dye the same amount of 1:1 caprolactamthiourea adduct.

We claim:

1. A solid dye preparation consisting essentially of a powder or granulates obtained by mixing in the dry state:
   (1) a 1:1 adduct of thiourea and a lactam, or a 1:1 adduct of dicyandiamide and said lactam, wherein said lactam is of the formula

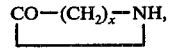

wherein
   $x$ is 3 to 6, or mixtures thereof;
   (2) a water-soluble acid dye in an amount that said preparation contains 0.2 to 1 part by weight of said lactam per part of said dyestuff;
   (3) alone or in the presence of dextrin, urea, sodium chloride, sodium sulphate, anionic dispersing or wetting agents, condensation products of cresol, naphtholsulfonic acid and formaldehyde, or antidusting agents.

* * * * *